(12) United States Patent
Wang et al.

(10) Patent No.: US 11,727,268 B2
(45) Date of Patent: Aug. 15, 2023

(54) SPARSE TRAINING IN NEURAL NETWORKS

(71) Applicant: Shanghai Cambricon Information Technology Co., Ltd., Pudong New Area (CN)

(72) Inventors: Zai Wang, Pudong New Area (CN); Shengyuan Zhou, Pudong New Area (CN); Shuai Hu, Pudong New Area (CN); Tianshi Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 832 days.

(21) Appl. No.: 16/698,979

(22) Filed: Nov. 28, 2019

(65) Prior Publication Data

US 2020/0104713 A1  Apr. 2, 2020

Related U.S. Application Data

(63) Continuation of application No. 16/698,976, filed on Nov. 28, 2019, now Pat. No. 11,544,542, which is a
(Continued)

(30) Foreign Application Priority Data

Jun. 21, 2017  (CN) .......................... 201710473955.2

(51) Int. Cl.
*G06N 3/08* (2023.01)
*G06N 3/084* (2023.01)
*G06N 3/047* (2023.01)
(52) U.S. Cl.
CPC ............... *G06N 3/08* (2013.01); *G06N 3/047* (2023.01); *G06N 3/084* (2013.01)

(58) Field of Classification Search
CPC ..................................................... G06N 3/084
See application file for complete search history.

(56) References Cited

U.S. PATENT DOCUMENTS 9,886,948 B1 *  2/2018  Garimella ............... G10L 15/16
10,147,442 B1 * 12/2018  Panchapagesan ........ G06N 3/04
(Continued)

FOREIGN PATENT DOCUMENTS

CN         1838031 A      9/2006
CN       101854526 A     10/2010
(Continued)

OTHER PUBLICATIONS

PCT/CN2018/090901—Search Report, dated Aug. 21, 2018, 9 pages.
(Continued)

*Primary Examiner* — Michael J Metzger
(74) *Attorney, Agent, or Firm* — Getech Law LLC; Jun Ye

(57) ABSTRACT

A computing device, comprising: a computing module, comprising one or more computing units; and a control module, comprising a computing control unit, and used for controlling shutdown of the computing unit of the computing module according to a determining condition. Also provided is a computing method. The computing device and method have the advantages of low power consumption and high flexibility, and can be combined with the upgrading mode of software, thereby further increasing the computing speed, reducing the computing amount, and reducing the computing power consumption of an accelerator.

16 Claims, 1 Drawing Sheet performing selectively zero-setting on corresponding gradients of N neurons included at an $i^{th}$ layer of a neural network according to a zero-setting condition, where $i$ represents an integer greater than 1, and N represents a positive integer using gradients that are not zeroed to perform training operations to obtain updated gradients and synapses

Related U.S. Application Data continuation-in-part of application No. PCT/CN2018/090901, filed on Jun. 12, 2018.

(56) References Cited

U.S. PATENT DOCUMENTS

| | | | | |
|---|---|---|---|---|
| 10,152,676 | B1* | 12/2018 | Strom | G06N 20/00 |
| 2017/0286830 | A1* | 10/2017 | El-Yaniv | G06N 3/084 |
| 2018/0075347 | A1* | 3/2018 | Alistarh | G06N 3/084 |
| 2018/0276564 | A1* | 9/2018 | Varma | G06N 5/003 |

FOREIGN PATENT DOCUMENTS

| | | | |
|---|---|---|---|
| CN | 104539263 | A | 4/2015 |
| CN | 105320495 | A | 2/2016 |
| CN | 105512723 | A | 4/2016 |
| CN | 106779068 | A | 5/2017 |
| CN | 106796668 | A | 5/2017 |
| CN | 109086880 | A | 12/2018 |

OTHER PUBLICATIONS

CN 201710441977.0—Second Office Action, dated Sep. 15, 2020, 9 pages.
CN 201710473955.2—First Office Action, dated Mar. 2, 2020, 3 pages. (No English Translation).
CN 201710473955.2—Second Office Action, dated May 15, 2020, 3 pages. (No English Translation).
CN 201710473955.2—Third Office Action, dated Aug. 24, 2020, 4 pages. (No English Translation).
CN 201710474297.9—First Office Action, dated May 15, 2020, 3 pages. (no English Translation).
CN 201710474297.9—Second Office Action, dated Nov. 12, 2020, 9 pages. (no English Translation).
CN 201710483182.6—First Office Action, dated Apr. 29, 2020, 9 pages. (no English Translation).
CN 201710495795.1—First Office Action, dated Dec. 30, 2019, 3 pages. (no English Translation).
CN 201710495795.1—Second Office Action, dated Mar. 25, 2020, 4 pages. (no English Translation).
PCT/CN2018/090901—International Search Report, dated Aug. 27, 2018, 10 pages. (no English translation).
EP 18818258.8—Response to the Invitation to File a Search Results Pursuant to Rule 70b(1) EPC dated Feb. 4, 2021, filed Feb. 18, 2021, 8 pages.
EP 18818258.8—Extended European Search Report, dated Jul. 21, 2020, 9 pages.
EP 18818258.8—Response to Extended European Search Report dated Jul. 21, 2020, dated Jan. 26, 2021, 14 pages.
Zhang, et al., "Power Optimization in Multipliers Using Multi-Precision Combined with Voltage Scaling Techniques", IEEE 1st Int'l Symposium on Quality Electronic Design—Asia, 2009, 4 pages.
Fayed, et al., "A Novel Architecture for Low-Power Design of Parallel Multipliers", Proceedings IEEE Computer Society Workshop on VLSI 2001. Emerging Technologies for VLSI Systems, 2001, pp. 149-154.
EP 19217768.1—Response to Extended European Search Report dated Apr. 24, 2020, dated Nov. 25, 2020, 11 pages.
EP 19217768.1—Response to Extended European Search Report dated Dec. 3, 2020, dated Jan. 29, 2021, 3 pages.
CN 201710441977.0, Official Action dated Apr. 7, 2020, 8 pages.
Shijin Zhang, et al. "Cambricon-X: An Accelerator for Sparse Neural Networks"; 49th Annual IEEE/ACM International Symposium on Microarchitecture; University of Chinese Academy of Sciences, Beijing, China; Dec. 15, 2016, 12 pages.
EP19217768.1, European Search Report dated Apr. 24, 2020, 9 pages.
Alham Fikri Aji et al., "Sparse Communication for Distributed Gradient Descent", arxiv.org, Cornell University Library, 201 Olin Library Cornell University Ithaca, NY 14853, Apr. 17, 2017, 6 pages.
Wei Wen et al., "TernGrad: Ternary Gradients to Reduce Communication in Distributed Deep Learning", arxiv.org, Cornell University Library, 201 Olin Library Cornell University Ithaca, NY 14853, May 22, 2017, 13 pages.
EP18818258.8—Communication pursuant to Article 94(3) EPC dated Mar. 27, 2023, 21 pages.

* cited by examiner

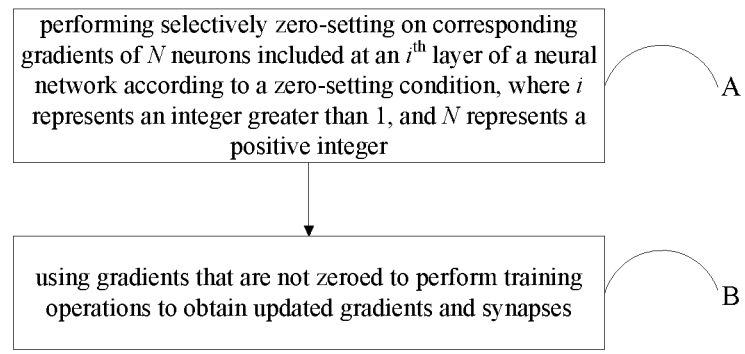

SPARSE TRAINING IN NEURAL NETWORKS

TECHNICAL FIELD

The disclosure relates to the field of artificial intelligence, and specifically relates to a sparse training method.

BACKGROUND

As the foundation of many current artificial intelligence applications, deep neural networks have been applied in various fields such as speech recognition, image processing, data analysis, advertisement recommendation system, and automated driving, which is considered as a breakthrough. Deep neural networks have thus gained a growing presence in many aspects of human life. However, the large quantity of operations performed by deep neural networks have always been a constraint for their development speed and further applications. When considering adopting an accelerator to improve the operation speed of a deep neural network, the numerous operations would inevitably cause great energy consumption and overhead, and similarly, constrain the further application of the accelerator.

Neural network operation may mainly be divided into two parts: forward inference and back training. The existing techniques often reduce the amount of operation by optimizing the operation part in forward inference. However, there is no effective method to further reduce the amount of operation in back training. In this case, the existing techniques fail to further reduce the amount of operation and increase the operation speed.

SUMMARY

In order to solve the problem or partially mitigate the problem, the present disclosure provides a sparse training method for neural networks. The sparse training method can set feedforward gradients of some neurons to zero in a certain way, so that synapses connected to the neurons do not update error values brought by the neurons, and neurons at an upper layer that are connected to the above-mentioned neurons do not accumulate the error values brought by the neurons either. In this way, the amount of operation may be reduced, and the operation speed may be increased. The sparse training method may not be affected whether synapses are dense or sparse, and may not affect the normal operation and related improvements of a forward inference stage.

The present disclosure provides a sparse training method, where the sparse training method may include:

selectively zeroing corresponding gradients of N neurons included at an $i^{th}$ layer of a neural network according to a zero-setting condition, where i represents an integer greater than 1, and N represents a positive integer; and performing training operations using gradients that are not zeroed to obtain updated gradients and synapses.

In an example of the disclosure, the zero-setting condition may include: a zero-setting probability condition, a zero-setting threshold condition, or a zero-setting percentage condition.

In an example of the disclosure, prior to zeroing corresponding gradients of selected neurons according to a zero-setting condition, the method may further include: screening N neurons included at the $i^{th}$ layer by adopting a random manner.

In an example of the disclosure, the random manner may include: Gaussian random, Bayesian probabilistic random, or systematic sampling.

In an example of the disclosure, the zero-setting condition may be a zero-setting probability condition, where the zero-setting probability is p. N*p neurons may be selected by adopting the random manner. Corresponding gradients of the N*p neurons may be set to zero.

In an example of the disclosure, the zero-setting condition may be a zero-setting threshold condition. The zero-setting threshold condition may include: being less than a given threshold, being greater than a given threshold, being within a given value range, or being outside a given value range.

In an example of the disclosure, the zero-setting threshold condition may be set as being less than a given threshold, where the given threshold is th. If a gradient is less than the given threshold th, the gradient may be set to zero; if the gradient is not less than the given threshold, the gradient may remain unchanged.

In an example of the disclosure, during a training process, the zero-setting threshold may be adjusted in a heuristic manner according to a heuristic condition.

In an example of the disclosure, the heuristic manner may include: performing tests by using test samples or verification samples, comparing result information of at least two tests among a plurality of tests, where the result information may include accuracy or loss.

In an example of the disclosure, an accuracy difference is obtained by comparing accuracy of a current test with accuracy of a previous test; or an accuracy difference is obtained by comparing accuracy of a current test with average accuracy of a plurality of previous tests.

As an alternative example, the heuristic condition may be either a heuristic threshold determination condition or a heuristic mapping determination condition.

Alternatively, the heuristic threshold determination condition may include: being less than a given threshold, being greater than a given threshold, being within a given value range, or being outside a given value range.

As an alternative example, the heuristic condition may be a heuristic threshold determination condition, if a difference between the accuracy obtained in a current test and the accuracy obtained in a previous test is greater than the heuristic threshold, the zero-setting threshold may be adjusted.

As an alternative example, the zero-setting threshold may be adjusted by using Simulated Annealing algorithm, Ant Colony Optimization algorithm, Genetic algorithm, List Searching algorithm, Evolutionary Programming, or Evolution Strategy.

As an alternative example, the zero-setting condition may be a zero-setting percentage condition, where the zero-setting percentage is q. Gradients of N neurons at the $i^{th}$ layer may be sorted according to a certain sorting rule. N*q neurons may be selected, and corresponding gradients of the neurons may be set to zero.

Alternatively, the sorting rule may include: sorting by ascending order, sorting by descending order, or sorting by mapping.

Alternatively, the rule for sorting by mapping may be: sorting gradients after taking absolute values of the gradients.

As an alternative example, after sorting, N*q neurons that are placed at a previous position, a subsequent position or a designated position may be selected.

As an alternative example, the neural network may be a convolutional neural network. Using a gradient that is not zeroed to perform training operations to obtain an updated gradient and a synapse includes:

for a convolutional layer, accumulating products of initial input neurons and un-zeroed gradients to obtain an update amount of synapses; for a fully connected layer, multiplying initial input neurons by un-zeroed gradients to obtain an update amount synapses;

accumulating initial synapses with the product of the update amount of synapse and a given learning rate to obtain updated synaptic values; and accumulating the products of initial synapses and un-zeroed gradients to obtain gradients of neurons at a previous layer, which is an $(i-1)^{th}$ layer.

As an alternative example, if no activation function exits at the $(i-1)^{th}$ layer, required gradients may be gradients of the $(i-1)^{th}$ layer obtained by operation; otherwise, the gradients of the $(i-1)^{th}$ layer obtained by operation may be multiplied by a derivative of the activation function, and the activated gradients obtained may be the required gradients.

An example of the present disclosure provides a processor including a storage unit and an operation unit. The processor can perform the sparse training method.

An example of the present disclosure provides a chip including the neural network processor.

An example of the present disclosure further provides a chip package structure including the chip.

Another example of the present disclosure provides a board card including the chip package structure.

It can be seen from the technical scheme above that the sparse training device of the disclosure may have at least one of the following technical effects:

(1) feedforward gradients of some neurons may be zeroed by adopting a certain method, so that the neurons may not transfer gradients during a second turn of back training, the quantity of operations may thus be reduced, and the operation speed may thus be accelerated.

(2) with the sparse training method of the disclosure, neurons may be zeroed by selecting a different method based on different user demands, and a percentage of zero-setting may be adjusted, thus having a certain degree of flexibility.

(3) the sparse training method of the disclosure may be applicable whether synapses are dense or sparse.

(4) the sparse training method of the disclosure may not affect normal operations and related improvements of a forward inference stage.

BRIEF DESCRIPTION OF THE DRAWINGS

FIG. 1 is a flowchart of a sparse training method in an example of the disclosure.

DETAILED DESCRIPTION

The present disclosure is explained more fully hereinafter with reference to specific examples and the accompanying drawings to facilitate a better understanding of the purposes, technical schemes and advantages of the disclosure.

It should be noted that in the description of the drawings or the specification, reference is made to the drawings, and the same reference numbers used designate the same or similar parts. The implementations that are not illustrated or described in the drawings are well-known to persons having ordinary skill in the art of the disclosure. Also, it should further be noted that, though instances including the parameters of specific values are provided herein, the parameters need not exactly equal the corresponding values. Instead, the parameters may approximates the corresponding values within an acceptable error tolerance or a design constraint.

In addition, the location words used in the examples hereinafter, such as "up", "down", "front", "back", "left", "right", and the like, merely indicate the location in the reference drawings. Thereby, the location words used are not intended to limit the disclosure.

Unless otherwise defined, all technical and scientific terms used herein have the same meaning as commonly understood by persons having ordinary skill in the art of the disclosure. The terms used in the specification of the disclosure are merely for the purpose of describing specific examples and are not intended to limit the disclosure. The phrase "and/or" used herein refers to the random and all combinations of one or a plurality of related items listed.

FIG. 1 is a flowchart of a sparse training method provided in an example of the present disclosure. The sparse training method may include the following steps:

Step A: performing selectively zero-setting on corresponding gradients of N neurons included at an $i^{th}$ layer of a neural network according to a zero-setting condition, where i represents an integer greater than 1, and N represents a positive integer.

Step B: using gradients that are not zeroed to perform training operations to obtain updated gradients and synapses.

Alternatively, the zero-setting may be performed according to the specific function and algorithm involved in the operations, for instance selecting essential elements according to a certain rule using PCA (Principal Component Analysis), and setting other non-essential elements to zero.

Alternatively, the zero-setting condition may include: a zero-setting probability condition, a zero-setting threshold condition, or a zero-setting percentage condition. Alternatively, prior to performing zero-setting on the corresponding gradients of the selected neurons according to the zero-setting condition, the following may be further included: screening N neurons included at the $i^{th}$ layer in a random manner. Alternatively, the random manner may include: Gaussian random, Bayesian probabilistic random, or systematic sampling.

As an alternative example, when the zero-setting condition is a zero-setting probability condition where the zero-setting probability is p, N*p neurons may be selected by adopting the random manner. Corresponding gradients of the N*p neurons may be set to zero.

As an alternative example, when the zero-setting condition is a zero-setting threshold condition, the zero-setting threshold condition may be one of the following: being less than a given threshold, being greater than a given threshold, being within a given value range or being outside a given value range. For instance, the zero-setting threshold condition is set as being less than a given threshold, where the given threshold is th. If a gradient is less than the given threshold th, the gradient may be set to zero; otherwise, the gradient may remain unchanged.

As an alternative example, during a training process, the zero-setting threshold may be adjusted in a heuristic manner according to a heuristic condition. Alternatively, the heuristic manner may be: using test samples or verification samples to perform tests, comparing result information of at least two tests among a plurality of tests, where the result information may include accuracy or loss.

As an alternative example, a method of obtaining an accuracy difference may include: comparing the accuracy of a current test and the accuracy of a previous test to obtain an accuracy difference; or comparing the accuracy of a current test and the average accuracy of a plurality of previous tests to obtain an accuracy difference.

As an alternative example, the heuristic condition may be either a heuristic threshold determination condition or a heuristic mapping determination condition. Alternatively, the heuristic threshold determination condition may include: being less than a given threshold, being greater than a given threshold, being within a given value range, or being outside a given value range.

As an alternative example, the heuristic condition may be set as a heuristic threshold determination condition, if a difference between the accuracy obtained in a current test and the accuracy obtained in a previous test is greater than the heuristic threshold, the zero-setting threshold may be adjusted.

As an alternative example, the zero-setting threshold may be adjusted by using the Simulated Annealing algorithm, the Ant Colony Optimization algorithm, the Genetic algorithm, the List Searching algorithm, the Evolutionary Programming, or the Evolution Strategy.

As an alternative example, the zero-setting condition may be set as a zero-setting percentage condition, where the zero-setting percentage is q. Gradients of N neurons at the $i^{th}$ layer may be sorted according to a certain sorting rule. N*q neurons may be selected, and corresponding gradients of the neurons may be set to zero. Alternatively, the sorting rule may include: sorting by ascending order, sorting by descending order, or sorting by mapping. Alternatively, the rule for sorting by mapping is to sort gradients after taking the absolute values of the gradients.

As an alternative example, the method may further include: after sorting, selecting N*q neurons that are placed at a previous position, a subsequent position or a designated position.

As an alternative example, when using the sparse training method provided in the present disclosure to train a convolutional neural network in a neural network, training operations may be performed by using gradients that are not zeroed so as to obtain updated gradients and synapses.

Specifically, for a convolutional layer, an update amount of synapses may be obtained by accumulating the products of initial input neurons and un-zeroed gradients; for a fully connected layer, an update amount of synapses may be obtained by multiplying initial input neurons by un-zeroed gradients; updated synaptic values may be obtained by accumulating initial synapses with the product of the update amount of synapse and a given learning rate; gradients of neurons at a previous layer, which is an $(i-1)^{th}$ layer, may be obtained by accumulating the products of initial synapses and un-zeroed gradients.

As an alternative example, if no activation function exits at the $(i-1)^{th}$ layer of the convolutional neural network that performs sparse training, required gradients may be gradients of the $(i-1)^{th}$ layer obtained by operation; otherwise, the gradients of the $(i-1)^{th}$ layer obtained by operation may be multiplied by the derivative of the activation function, and the activated gradients obtained may be the required gradients.

An example of the present disclosure provides a processor, where the processor may include a storage unit and an operation unit. The processor may be capable of performing the sparse training method provided in any of the examples above. When a sparse training method provided in an above example is implemented to train a neural network, feedforward gradients of some neurons may be set to zero through a certain manner, so that synapses connected to the neurons do not update error values brought by the neurons, neurons at an upper layer that are connected to the above-mentioned neurons do not accumulate the error values brought by the neurons either. The amount of operation may thus be reduced, and the operation speed may be increased. The sparse training method may not be affected whether synapses are dense or sparse, and may not affect the normal operation and related improvements of a forward inference stage.

The disclosure further provides an example that illustrates the training of a neural network by using the sparse training method provided in the example above. For the convenience of the following description, relevant variables are explained herein. During a forward operation of a neural network, nin represents a known neuron, w represents synaptic data, and nout represents a result obtained. During a back operation, gradient represents a known gradient corresponding to nout, gradient' represents a corresponding gradient of nin obtained by operation, and w' represents synaptic data after operating and updating. In the present example, a feedforward gradient may be set to zero according to a given zero-setting probability. A fully connected layer is taken as an instance to explain a detailed training process, which is as follows:

assuming that a gradient gradient of an $i^{th}$ layer is known, updating a previous layer, which is a $(i-1)^{th}$ layer to obtain the gradient gradient' and the synapse w' of the $(i-1)^{th}$ layer. Then assuming that the $i^{th}$ layer includes N neurons (nout) and a zero-setting probability is p. Using a random manner such as Gaussian random, Bayesian probabilistic random, systematic sampling, or the like, to randomly select [N*p] neurons (nout), and setting corresponding gradients of the neurons to zero. Then performing operations by multiplying the known neurons (nin) by gradient to obtain an update amount of synapse. Multiplying the update amount by a given learning rate, and accumulating the product with the initial synapse w to obtain the updated synaptic value w'. Accumulating the products of the initial synapse w and gradient to obtain a corresponding gradient of the neurons (nin) at the previous layer, which is the $(i-1)^{th}$ layer. If no activation function exists at the $(i-1)^{th}$ layer, required gradients gradient' may be gradients obtained by operations; if an activation function exists, multiplying the gradients obtained by operations and the derivative of the activation function, the activated gradients obtain may be the required gradients gradient'. The method may be applied in a whole training process of a neural network, or in a training process of some layers of the neural network.

Alternatively, when using the sparse training method above to train a convolutional layer, an update amount of synapse may be obtained by accumulating the products of initial input neurons and un-zeroed gradients.

The present disclosure further provides another example illustrating training a neural network by using the sparse training method provided in the example above. For convenience of the following description, relevant variables are explained here. During forward operation of a neural network, nin represents a known neuron, w represents synaptic data, nout represent an obtain ed result. During a back operation, gradient represents a corresponding gradient of nout, which is known, gradient' represents a corresponding gradient of nin obtained by operation, and w' represents synaptic data after operating and updating. In the present example, a threshold is given. A feedforward gradient may be set to zero according to the threshold given by a user, then the threshold may be adjusted in a heuristic manner. A fully connected layer is taken as an instance to explain a detailed training process, which is as follows:

assuming that a gradient gradient of an $i^{th}$ layer is known, updating a previous layer, which is a $(i-1)^{th}$ layer, to obtain a gradient gradient' and a synapse w' of the $(i-1)^{th}$ layer.

Assuming a zero-setting threshold is th. Determining sequentially whether the absolute value of each gradient is less than th. If the absolute value of each gradient is less than th, setting the value to zero, otherwise, keeping gradient unchanged. Then performing operations by multiplying known initial neurons (nin) by gradient to obtain an update amount of synapse, multiplying the update amount by a given learning rate, then accumulating the product with the initial synapse w to obtain an updated synaptic value w'. Multiplying the initial synapse w and gradient to obtain a corresponding gradient of neurons (nin) at the previous layer: $(i-1)^{th}$ layer. If no activation function exists at the $(i-1)^{th}$ layer, required gradients gradient' may be the gradients obtained by operations; if an activation function exists at the $(i-1)^{th}$ layer, multiplying the gradients obtained by operations and the derivative of the activation function, the activated gradients obtained may be the required gradient'. The method may be applied in a whole training process of a neural network, or in a training process of some layers of the neural network.

Alternatively, when using the sparse training method above to train a convolutional layer, an update amount of synapse may be obtained by accumulating the products of initial input neurons and un-zeroed gradients.

It should be understood that, during a training process, a simple heuristic manner may be used for adjusting a threshold. In other words, a heuristic condition is given in a training process, and the threshold may be adjusted when the heuristic condition is met. It is assumed that a heuristic condition is that when a current model is tested periodically using test samples (or verification samples), the threshold may be adjusted, for instance, being reduced by 10% (all the specific numbers can be adjusted) if a loss obtained from comparing the accuracy of the present test and the accuracy of a previous test is greater than a threshold, or if the average accuracy of consecutive tests is greater than a given threshold. The heuristic condition herein may further be that the loss obtained by comparing the accuracy of a new test and the accuracy of a previous test is within a given range, or that the loss obtained by comparing average accuracies of a plurality of consecutive tests is greater than a given threshold. In addition, other common heuristic algorithms may also be used, such as the Simulated Annealing algorithm, the Ant Colony Optimization algorithm, the Genetic algorithm, the List Searching algorithm, the Evolutionary Programming, and the Evolution Strategy, so as to determine whether and how to adjust a zero-setting threshold.

The present disclosure further provides another example showing using the sparse training method provided in the above example to train a neural network. For the convenience of the following description, relevant variables are explained herein. During forward operation of a neural network, nin represents a known neuron, w represents synaptic data, nout represent a result obtained. During back operation, gradient represents a known corresponding gradient of nout, gradient' represents a corresponding gradient of nin obtained by operations, and w' represents synaptic data after operating and updating. In the present example, a manner of zero-setting percentage may be used. A feedforward gradient may be set to zero according to a zero-setting percentage given by a user. A fully connected layer is taken as an instance to explain a detailed training process, which is as follows:

assuming that a gradient gradient of an $i^{th}$ layer is known, updating a previous layer, which is a $(i-1)^{th}$ layer, to obtain a gradient gradient' and a synapse w' of the $(i-1)^{th}$ layer. Then assuming that the $i^{th}$ layer includes N neurons (nout), and a zero-setting percentage is q. Sorting gradients by following a certain sorting rule. The sorting rule may include: sorting in ascending order, in descending order, or in mapping order, where sorting in the mapping order is sorting gradients after taking the absolute values of the gradients. In the present disclosure, for instance, the absolute values of gradients may be sorted by following ascending order; then the first [N*q] gradients, which are [N*q] neurons (nout) whose absolute values are relatively small, may be set to zero, where, after sorting, [N*q] neurons at the rear or at a designated position may be selected according to different sorting rules, and others may remain unchanged. Then performing operations by multiplying the known initial neurons (nin) and gradient to obtain an update amount of synapse, multiplying the update amount by a given learning rate, and accumulating the product with the initial synapse w to obtain an updated synaptic value w'. Accumulating the products of the initial synapse w and gradient to obtain gradients of the neurons (nin) at the previous layer $(i-1)^{th}$ layer. If no activation function exists at the $(i-1)^{th}$ layer, required gradients gradient' may be the gradients obtained by operations; if an activation function exists at the $(i-1)^{th}$ layer, multiplying gradients obtained by operations and the derivative of the activation function, and the activated gradients obtained may be the required gradient'. The method may be applied in a whole training process of a neural network, or in a training process of some layers of the neural network.

Alternatively, when using the sparse training method above to train a convolutional layer, an update amount of synapse may be obtained by accumulating the products of initial input neurons and un-zeroed gradients.

A processor is provided in an example of the present disclosure. The processor may include a storage unit and an operation unit, and may be capable of performing a sparse training method provided in any of the examples above.

Alternatively, the processor may include a general-purpose microprocessor, an instruction set processor and/or a related chip set and/or a special-purpose microprocessor (e.g., ASIC). The processor may further include an onboard memory for caching purposes. Optionally, a special-purpose neural network processor may be used.

An example of the present disclosure provides a chip including the neural network processor provided in any of the above-mentioned examples.

An example of the present disclosure further provides a chip package structure including the chip provided in the example above.

Another example of the present disclosure provides a board card including the chip package structure provided in the example above.

Another example of the present disclosure provides an electronic device including the board card provided in the example above. The electronic device may include a data processing device, a robot, a computer, a printer, a scanner, a tablet, a smart terminal, a mobile phone, a driving recorder, a navigator, a sensor, a webcam, a cloud server, a camera, a video camera, a projector, a watch, an earphone, a mobile storage, a wearable device, a vehicle, a household appliance, and/or a medical facility.

The vehicle may include an airplane, a ship and/or a car. The household appliance may include a television set, an air conditioner, a microwave oven, a refrigerator, a rice cooker, a humidifier, a washing machine, an electric lamp, a gas stove, and a range hood. The medical device may include a nuclear magnetic resonance instrument, a B-ultrasound machine, and/or an electrocardiograph.

Besides, it should be noted that a neural network of the present disclosure may include, but is not limited to a convolution neural network, and may also be a fully connected neural network, a RBM (Restricted Boltzmann Machine) neural network, a recurrent neural network, and the like. The neural network of the present disclosure is not limited to a fully connected layer, and may also be a convolution layer, a pooling layer, or the like.

The above-mentioned examples merely describe several implementations of the disclosure. It should be understood that the description of the examples, while being relatively specific and detailed, are not given by way of limitation on the scope of the disclosure. It should be noted that, those skilled in the art may make changes and modifications without departing from the disclosure in its broader aspects, which all fall within the scope of protection of the disclosure. Therefore, the protection scope of the disclosure should be subject to the protection scope of the claims.

What is claimed is:

1. A sparse training method comprising:
   selectively zeroing one or more gradients corresponding to one or more neurons included in a layer of a neural network according to a zero-setting condition;
   performing training operations by using one or more non-zeroed gradients to obtain updated gradients and synapses; and
   screening the one or more neurons included in the layer randomly prior to zeroing corresponding gradients of selected neurons according to the zero-setting condition,
   wherein the zero-setting condition is a zero-setting probability condition, wherein the zero-setting probability is p, N*p neurons are selected randomly, and corresponding gradients of the N*p neurons are set to zero.

2. The sparse training method of claim 1, wherein the zero-setting condition is a zero-setting threshold condition, wherein the zero-setting threshold condition includes: being less than a given threshold, being greater than a given threshold, being within a given value range, or being outside a given value range, and
   wherein the zero-setting threshold condition is being less than a given threshold, where the given threshold is set to a first threshold, when a gradient is less than the first threshold, the gradient is set to zero, and when the gradient is not less than the given threshold, the gradient remains unchanged.

3. The sparse training method of claim 2, wherein during a training process, the zero-setting threshold is adjusted in a heuristic manner according to a heuristic condition.

4. The sparse training method of claim 3, wherein the heuristic manner includes: performing tests by using test samples or verification samples, and comparing result information of at least two tests among a plurality of tests, wherein the result information includes accuracy or loss.

5. The sparse training method of claim 4, wherein an accuracy difference is obtained by comparing accuracy of a current test with accuracy of a previous test, or an accuracy difference is obtained by comparing accuracy of a current test with average accuracy of a plurality of previous tests.

6. The sparse training method of claim 3, wherein the heuristic condition includes: a heuristic threshold determination condition or a heuristic mapping determination condition.

7. The sparse training method of claim 3, wherein the heuristic condition is a heuristic threshold determination condition, when a difference between accuracy obtained in a current test and accuracy obtained in a previous test is greater than a heuristic threshold, the zero-setting threshold is adjusted.

8. The sparse training method of claim 1, wherein the zero-setting condition is a zero-setting percentage condition, wherein the zero-setting percentage is q, gradients of the one or more neurons at the layer are sorted according to a given sorting rule, a plurality of neurons are selected based on the zero-setting percentage and a count of the one or more neurons, and corresponding gradients of the neurons are set to zero.

9. The sparse training method of claim 8, wherein after sorting, the plurality of neurons that are placed at a previous position, a subsequent position or a designated position are selected.

10. The sparse training method of claim 1, wherein the neural network is a convolutional neural network, the performing training operations by using gradients that are not zeroed to obtain updated gradients and synapses includes:
    for a convolutional layer, accumulating products of initial input neurons and un-zeroed gradients to obtain an update amount of synapses, for a fully connected layer, multiplying initial input neurons and un-zeroed gradients to obtain an update amount of synapses, multiplying the update amount of synapse and a given learning rate, accumulating a product and initial synapses to obtain updated synaptic values,
    multiplying the initial synapses and the un-zeroed gradients, and accumulating a product to obtain gradients of neurons at a previous layer, which is an (i-1)th layer.

11. The sparse training method of claim 10, wherein when no activation function exits at the previous layer, required gradients are gradients of the previously layer obtained by operation, otherwise, the gradients of the previously layer obtained by operation are multiplied by a derivative of the activation function, and activated gradients obtained are the required gradients.

12. A processor, comprising:
    a storage unit configured to store data associated with one or more neurons included in a layer of a neural network; and
    an operation unit configured to:
      selectively zero one or more gradients corresponding to the one or more neurons included in the layer of the neural network according to a zero-setting condition;
      perform training operations by using one or more non-zeroed gradients to obtain updated gradients and synapses; and
      screen the one or more neurons included in the layer randomly prior to zeroing corresponding gradients of selected neurons according to the zero-setting condition, wherein the zero-setting condition is a zero-setting probability condition, wherein the zero-setting probability is p, N*p neurons are selected randomly, and corresponding gradients of the N*p neurons are set to zero.

13. The processor of claim 12, wherein the zero-setting condition is a zero-setting threshold condition, wherein the zero-setting threshold condition includes: being less than a given threshold, being greater than a given threshold, being within a given value range, or being outside a given value range, and
    wherein the zero-setting threshold condition is being less than a given threshold, where the given threshold is set to a first threshold, when a gradient is less than the first threshold, the gradient is set to zero, and when the gradient is not less than the given threshold, the gradient remains unchanged.

14. The processor of claim 13, wherein during a training process, the zero-setting threshold is adjusted in a heuristic manner according to a heuristic condition.

15. The processor of claim 14, wherein the operation unit is further configured to
   perform tests by using test samples or verification samples, and
   compare result information of at least two tests among a plurality of tests, wherein the result information includes accuracy or loss.

16. An electronic device, comprising:
   a processor that includes:
   a storage unit configured to store data associated with one or more neurons included in a layer of a neural network; and
   an operation unit configured to:
      selectively zero one or more gradients corresponding to the one or more neurons included in the layer of the neural network according to a zero-setting condition;
      perform training operations by using one or more non-zeroed gradients to obtain updated gradients and synapses; and
      screen the one or more neurons included in the layer randomly prior to zeroing corresponding gradients of selected neurons according to the zero-setting condition, wherein the zero-setting condition is a zero-setting probability condition, wherein the zero-setting probability is p, N*p neurons are selected randomly, and corresponding gradients of the N*p neurons are set to zero.

* * * * *